Oct. 23, 1945.    R. N. MEINERT    2,387,524
DEHYDROGENATION PROCESS
Filed Aug. 14, 1942
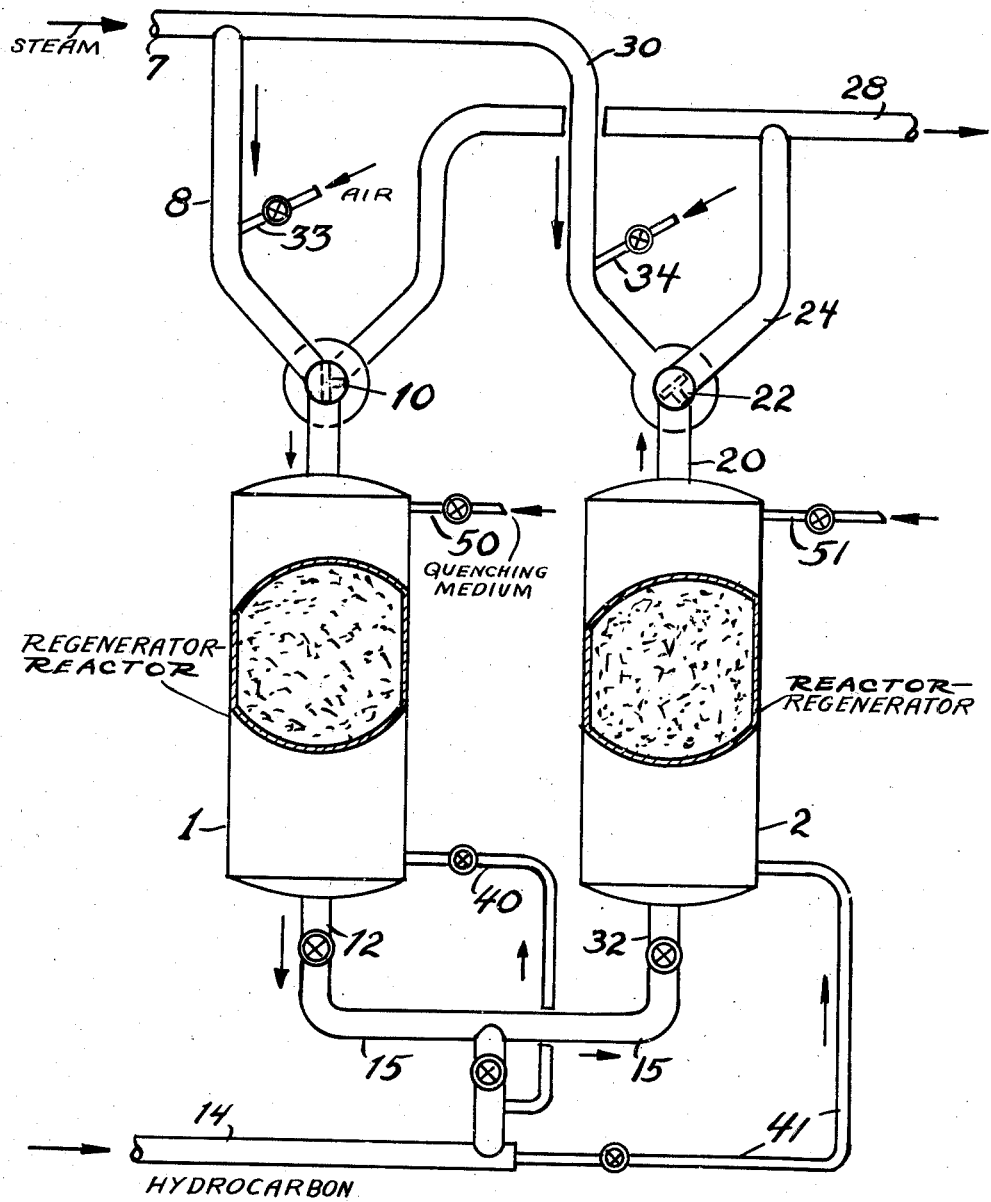
Richard N. Meinert Inventor
By [signature] Attorney Patented Oct. 23, 1945

2,387,524

UNITED STATES PATENT OFFICE 2,387,524

DEHYDROGENATION PROCESS

Richard N. Meinert, Westfield, N. J., assignor to Standard Oil Development Company, a corporation of Delaware Application August 14, 1942, Serial No. 454,760

3 Claims. (Cl. 260—680)

The present invention relates to improved methods for dehydrogenating hydrocarbons and, more particularly, it relates to the dehydrogenation of butenes to butadiene in a continuous operation employing pairs of reactors insuring continuity of operation, control of temperature conditions, economy in operation and other advantageous results.

The hydrocarbon compound known as butadiene has become of great importance recently since it is an intermediate or starting material useful in the production of rubber and rubber substitutes when it is copolymerized in the presence of other polymerizable substances, such as styrene, various nitriles, and the like.

Normally the production of butadiene in an oil refinery or in any other industrial process is not large. Consequently, in order to satisfy commercial demands, it is necessary to produce butadiene specially and this is accomplished ordinarily by dehydrogenating butenes.

The butene to butadiene reaction is a sensitive one and careful precautions have to be taken during its production to prevent degradation of the butadiene formed into undesirable side products. It is especially necessary to operate with low butene partial pressures, preferably $\frac{1}{4}$ to $\frac{1}{10}$ atmosphere, to obtain good yields of butadiene. This low partial pressure of butene can be obtained either by operating in vacuo or by diluting the butenes with a gaseous diluent. The latter is preferable since it results in a more economical plant, simplifies temperature control and eliminates the explosion hazard which is present in operations with hydrocarbons at high temperature in a vacuum system where failure of any part would admit air. Steam is an economical and easily handled diluent, and is preferred for dehydrogenating butenes to butadiene, although other diluents such as nitrogen, carbon dioxide, methane, flue gas, etc. may be employed. Steam has two important advantages over other diluents in that it is readily separated by condensation from the hydrocarbon and that it reacts with carbon deposited on the catalyst and forms water gas, thus keeping the carbon deposition at a minimum during the butene dehydrogenation cycle. Any residual carbon is removed by periodically stopping the butene feed and continuing the steam flow, thus effecting complete regeneration of the catalyst without the necessity of blowing air or an oxygen containing gas mixture over the catalyst. The elimination of the air regeneration system greatly simplifies the construction and operation of commercial plants since no purging of the catalyst is required when changing from dehydrogenation to regeneration and vice versa.

A catalyst containing a major proportion of magnesium oxide and a minor proportion of iron oxide, together with a stabilizer, such as copper oxide, and a promoter, such as potassium oxide is highly satisfactory as a catalyst for the dehydrogenation of butene to butadiene. It is particularly suitable because it is stable against and substantially unaffected by steam which is an important diluent in the manufacture of butadiene by dehydrogenating butenes. The composition of such a catalyst is set forth in the application of Kenneth K. Kearby, Serial No. 430,873 filed February 4, 1942.

My present invention, as indicated, relates to a continuous method for dehydrogenating butenes to butadiene, and I employ two reactors or a multiple of two reactors containing catalyst, continuity being maintained by regenerating the catalyst in one of a pair of reactors while the dehydrogenation reaction is proceeding in the other of said pair of reactors. Of course, as previously indicated I may use any multiple of two reactors, if that is necessary and desirable.

The main object of my present invention is to dehydrogenate butenes to butadiene in an operation in which means are provided to effect economies in equipment and utilities and, at the same time, to maintain continuity of operation.

A more specific object of my invention is to dehydrogenate butenes catalytically and in the presence of added steam to form butadiene and to so manipulate the process as to maintain the conversion level at a desired rate and to regenerate the catalyst by the use of steam whereby better temperature control is effected.

A further specific object of my invention is to dehydrogenate butenes catalytically in the presence of relatively large volumes of diluent steam to form butadiene by a process in which the steam is utilized first to strip off residual carbon on the catalyst in one reactor during regeneration and is then used to dilute the butene feed to a second reactor, thereby reducing the amount of high temperature steam consumed in the process, and reducing the number of valving operations required during the operating cycle.

Other and further objects of my invention will appear from the following more detailed description and claims.

In the accompanying drawing, I have indicated diagrammatically an apparatus in which butadiene may be formed by dehydrogenating butenes in a preferred modification of my present invention. I shall now set forth a specific example of my invention and in order to afford a better understanding thereof, I shall refer to the drawing.

Referring in detail to the drawing, 1 and 2 represent a pair of reactors containing catalyst which may, for example, be catalyst consisting of a major portion of magnesium oxide, a minor portion of an iron oxide, a promoter, and a stabilizer such as disclosed in the Kearby application previously referred to. This particular type of catalyst, as previously indicated, is especially suitable for my present process since it is not affected by steam which I employ as a diluent for the olefin undergoing dehydrogenation and also during the regeneration of fouled catalyst. The catalyst may be in the form of pills, pellets, granules, and the like. We will assume that while butene is undergoing dehydrogenation in reactor 2, the catalyst in 1 is undergoing regeneration. Valves 10 and 22 are shown in proper position in the drawing for this assumption. For the latter purpose steam from some suitable source at a temperature of from 1300–1500° F. is introduced through line 7 and line 8 controlled by valve 10 into the top of reactor 1 and thence passes downwardly through the catalyst where it reacts with the carbon in the coke deposits on the catalyst to form $CO_2$ and $CO$. The steam and water gas are withdrawn from reactor 1 through a bottom draw-off pipe 12 at a temperature slightly lower than the temperature of the steam entering reactor 1 due to the endothermic nature of the water gas reaction hereinbefore indicated. The steam withdrawn through line 12 may, if desired, be heated to compensate for heat lost in the water gas generation reaction, because this gas will be used to dilute the butene passing into reactor 2.

Simultaneously, butene heated in a suitable furnace (not shown) to a temperature of from 900–1200° F. is discharged from line 14 into line 15 and the mixture is then discharged into the bottom of reactor 2 containing the active or regenerated catalyst. The presence of $CO$ and $CO_2$ in nowise interferes with the dehydrogenation. The amount of diluent, that is to say, the amount of steam, $CO$ and $CO_2$ should be from 4–20 volumes per volume of butene, preferably within the ratio of 7:1 to 15:1 of steam to butene. The process is carried out at a total pressure only slightly above atmospheric, preferably 1–10 lbs. gauge. Butene partial pressure should be below 3 lbs./sq. in. absolute, preferably 1–2.5 lbs. absolute.

Conditions are so adjusted, particularly with respect to flow rate or space velocity that the butene is resident in the reaction zone for a relatively short period of time, as say from 1/20 to 2 seconds, whereupon the reaction products are withdrawn from the reactor through line 20 controlled by valve 22 and discharged into line 24 from which they may be discharged into a manifold 28 leading to condensing and fractionating equipment to recover the desired butadiene. The details of recovering butadiene by fractionating or a combination of fractionation and solvent extraction are not shown in the drawing nor fully described in the present disclosure because these details are well known to those familiar with this particular art. It will be sufficient disclosure to say that any known method for recovering butadiene may be employed and suitable means also may be employed to recycle unreacted butene to the present dehydrogenation system.

When the catalyst in reactor 2 has become contaminated with coke or other deposits as a result of the dehydrogenation operation to the extent that its activity is seriously impaired, the steam in line 7 by operation of valves 10 and 22 is discharged through line 30 into reactor 2, and the regeneration gas and steam are withdrawn through line 32 and mixed, as before, in line 15 with butadiene from line 14, but in this case the mixture passes through line 12 into the bottom of reactor 1 and dehydrogenation of the butene takes place in reactor 1. Substantially the same conditions prevail in reactor 1 as previously described in connection with the description of the manner of operation in reactor 2.

Valves 10 and 22 are three-way valves, making possible the discharge of steam from manifold 7 either into reactor 1 or 2 as desired.

The process proceeds in the manner indicated, that is to say, the flow of steam through the reactors is reversed periodically and the butene is alternately passed with the steam into one of the two reactors shown while catalyst is being regenerated in the other. During the regeneration of the catalyst, a small amount of air may be mixed with the steam in order to aid in the regeneration, that is to say, a small amount of air may be discharged from line 33 into line 8 or from line 34 into line 30 when steam is entering reactor 1 or reactor 2. Also, the butene may be discharged directly from line 14 through lines 40 and 41 into reactors 1 and 2, respectively, during the dehydrogenation operation in said reactors. In all cases, however, it is preferable that the butene be heated to its final active dehydrogenation temperature of 1150–1350° F. by admixture with superheated steam, that is to say, while it is preferable to preheat the butene to temperatures of say 800–1000° F. before mixing it with superheated steam, it should not for best results be heated above 1100° F. in the preheating operation.

Also, it may be desirable to discharge into reactors 1 and 2 through pipes 50 and 51, a quenching medium during the dehydrogenation operation in order to lower the temperature of the reaction products to prevent undesired side reactions and degradation of butadiene formed and to maintain a high degree of selectivity. It has been found that where 25–35% of the butene is converted per pass to butadiene, 80% of this or 20–28% may be recovered as butadiene by maintaining short contact times and otherwise observing the precautions hereinbefore set forth. By discharging a cooling fluid, such as low temperature steam, into the reaction products leaving the reactor, the temperature may be lowered to 1000° F. or thereabouts at which temperatures the butadiene is fairly stable.

To recapitulate briefly, my present invention relates to an improved method of carrying out the dehydrogenation of butenes to form butadiene, and in its essence it involves providing a pair of reactors containing the catalyst, which reactors are alternately used to dehydrogenate butadiene, but when one of the reactors is on the onstream or dehydrogenation reaction, the other is undergoing regeneration of catalyst fouled during the previous dehydrogenation operation so that continuity of operation is effected. I consider the main advantages of my invention to be the following:

1. Economy in the use of steam.
2. Use of high temperature steam during regeneration thereby facilitating the complete removal of carbon from the catalyst.
3. Economies in heat since one heating of the steam serves for both steps of the process, that is the productive step of dehydrogenating the butene and the second step of regenerating the catalyst.

While I have described in detail the method of dehydrogenating butene, it should also be borne in mind that my process is also applicable to dehydrogenation of any low molecular weight mono-olefin; also, the dehydrogenation of aralkyl compounds, such as ethyl benzene to form styrene, propyl benzene to form alpha-methyl-styrene, and other compounds.

Many modifications of my invention will readily suggest themselves to those who are familiar with this art.

What I claim is:

1. The method of dehydrogenating hydrocarbons in a continuous operation which comprises providing a pair of reactors containing a dehydrogenation catalyst consisting essentially of a major proportion of magnesium oxide and a minor proportion of iron oxide, copper oxide, and potassium oxide, which catalyst is stable against deactivation by steam, preheating the hydrocarbons to be dehydrogenated to temperatures below active dehydrogenation temperatures, contacting the preheated hydrocarbons with steam at a temperature from 1200–1500° F. in amount per volume of hydrocarbons sufficient to reduce the partial pressure of the hydrocarbons to about one-quarter to about one-tenth atmosphere and to reduce carbon formation during the course of the dehydrogenation, and in the presence of a catalyst for a relatively short period of time in the first of said pair of reactors, simultaneously regenerating fouled catalyst in the second of said reactors by means of superheated steam in amounts sufficient to provide a regeneration gas containing large quantities of steam, withdrawing said regeneration gas from the catalyst undergoing regeneration in the last named reactor, and using the regeneration gas as a heating medium and diluent for the hydrocarbons discharged into the first of said reactors, to obtain the partial pressure relationship aforesaid.

2. The method of dehydrogenating butene to prepare butadiene in a continuous operation, which comprises providing a pair of reactors containing a dehydrogenation catalyst consisting essentially of a major proportion of magnesium oxide and minor proportions of iron oxide, copper oxide, and potassium oxide, which catalyst is stable against deactivation by steam, conducting the dehydrogenation in one of said reactors in the presence of steam in amount per volume of butene, sufficient to obtain a partial pressure of butene from about one-quarter to about one-tenth atmosphere and to reduce carbon formation during the course of the dehydrogenation, and utilizing as a source of said steam the regenerating gas obtained by treating fouled catalyst in the other of said pair of reactors with a large excess of steam, the steam being present in the regenerating gas in amount sufficient to produce the partial pressure relationship aforesaid.

3. The method set forth in claim 1 in which temperatures employed are between 1150–1250° F., pressures are imposed on the system of 1–10 lbs. per square inch gauge pressure, the steam to hydrocarbon molar ratio is from 7:1 to 15:1, the reactants contact the catalyst at reaction temperatures at a period of 0.1 to 1 second, and where the steam entering the regeneration zone is at a temperature of from 1200–1300° F.

RICHARD N. MEINERT.